United States Patent [19]
Zentgraf et al.

[11] Patent Number: 4,570,861
[45] Date of Patent: Feb. 18, 1986

[54] METHOD OF AND ARRANGEMENT FOR ELECTROSTATIC SEPARATION OF PAPER- AND SYNTHETIC PLASTIC MATERIAL-CONTAINING MIXTURES

[75] Inventors: Helmut Zentgraf, Burghaun; Günter Fricke, Bad Hersfeld, both of Fed. Rep. of Germany

[73] Assignee: Kali und Salz AG, Kassel, Fed. Rep. of Germany

[21] Appl. No.: 517,355

[22] Filed: Jul. 25, 1983

[30] Foreign Application Priority Data

Jul. 26, 1982 [DE] Fed. Rep. of Germany ....... 3227874

[51] Int. Cl.[4] .............................................. B02C 23/08
[52] U.S. Cl. .................................. 241/24; 209/127.1; 241/79.1; 241/DIG. 38
[58] Field of Search ........... 209/127 R, 127 A, 127 C, 209/128, 129, 130, 131; 241/80, 97, 24, 19, 79.1, 29, DIG. 38

[56] References Cited
U.S. PATENT DOCUMENTS 3,856,217 12/1974 Brewer .............................. 241/79.1
4,092,241 5/1978 Mackenzie et al. ............ 209/127 A

OTHER PUBLICATIONS

Dry Separation of Pyrite from Coal, Abel et al., Ind. Eng. Chem. Prod. Res. Develop., vol. 11, 1972.
Industrieanzeiger, Bahr et al., 12–1977, pp. 2021-2025.
Grubbs et al., Recovering Plastics from Urban Refuse by Electrodynamic Techniques, 12-1972.

Primary Examiner—Mark Rosenbaum
Attorney, Agent, or Firm—Michael J. Striker

[57] ABSTRACT

An elecrtrostatic separation of paper- and synthetic plastic material-containing mixtures is performed by comminuting the mixture, triboelectrically charging the comminuted mixture, and supplying it into a free-fall separator, wherein a paper-enriched and a synthetic plastic material-enriched fraction are produced, and in some cases they can be treated in a second electrostatic separation step to pure products.

5 Claims, 1 Drawing Figure

METHOD OF AND ARRANGEMENT FOR ELECTROSTATIC SEPARATION OF PAPER- AND SYNTHETIC PLASTIC MATERIAL-CONTAINING MIXTURES

BACKGROUND OF THE INVENTION

The present invention relates to a method of and arrangement for separating paper- and synthetic plastic material-containing mixtures.

Synthetic plastic materials are produced from valuable raw materials. Synthetic plastic material wastes are now predominantly burned or collected in deposits. Taking into consideration the environmental protection and the increased depletion of raw materials, the recovery of synthetic plastic material and paper from wastes is of increasing importance.

Bahr and Vogt compare in "Industrieanzeiger" 99, pp. 2021 ff (1077) various methods of processing of synthetic plastic material wastes. They mention also electrostatic methods which, however, are not described in detail. In accordance with Grubbs and Ivey in "US Bureau of Mines Solid Waste Research Program", TPR 63 (1972), the paper-/synthetic plastic material-mixtures are electrostatically separated on a roller separator. After the comminuting cutting of the mixture and charging the particles in ion stream of a corona discharge, the mixture to be separated is supplied to the roller separator and separated into a synthetic plastic material fraction and a paper fraction. Condition for the separation result is, however, that the mixture to be separated prior to feeding to the separator must have a definite mixture of approximately 50%. Since it is known that the roller cutter permits only low material throughput, only low quantities of waste can be processed with the known methods and arrangements.

SUMMARY OF THE INVENTION

Accordingly, it is an object of the present invention to provide a method of and an arrangement for electrostatic separation of paper- and synthetic plastic material-containing mixtures, which avoids the disadvantages of the prior art.

More particularly, it is an object of the present invention to provide a method of electrostatic separation of paper- and synthetic plastic material-containing mixtures in accordance with which the mixture can be separated in a continuous process without high technical expenses with high material throughput into its components.

In keeping with these objects and with others which will become apparent hereinafter, one feature of the present invention resides, briefly stated, in a method of electrostatic separation of a paper- and synthetic plastic material-containing mixture in accordance with which the mixture is comminuted into stripes or chips of approximately 3-4 mm in width and approximately 10-20 mm in length, these particles being triboelectrically charged in an atmosphere having a relative moisture of 5-20% at a temperature of between 25° and 80° C., and supplied into a free-fall separator in which an electrostatic field of between 1-4 kV/cm is maintained, whereby on the base of this cutter in the vicinity of the positive electrode a paper-enriched fraction, and in the vicinity of the negative electrode a synthetic plastic material-enriched fraction, are collected, whereas an intermediate material is collected therebetween and again supplied to the separator.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
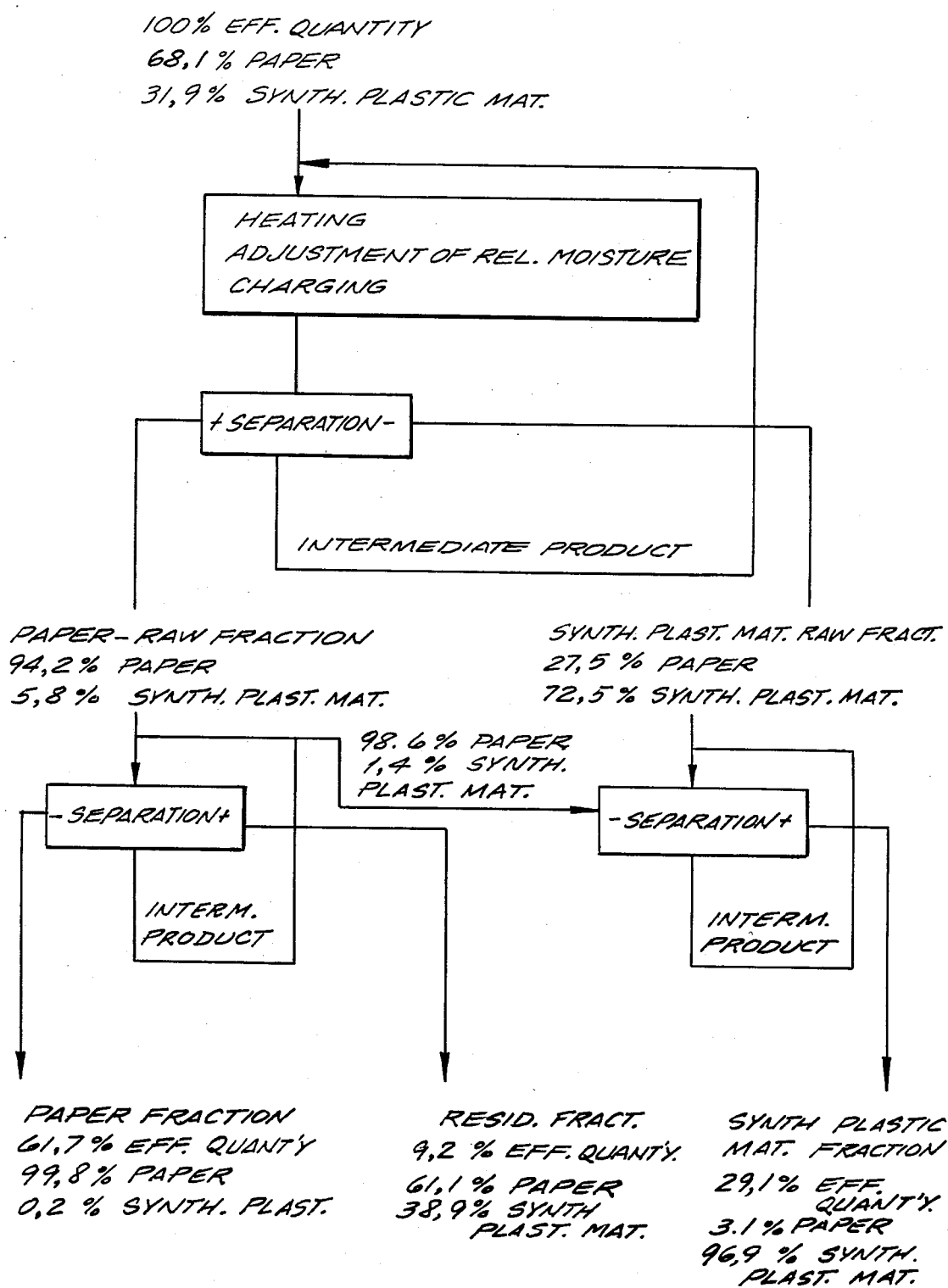
FIG. 1 is a view showing a flowchart of the inventive method.

As an initial material for an electrostatic separation in accordance with the present invention, any paper- and synthetic plastic material-containing mixture of two or more components is suitable. For example, a mixture which is a result of processing of household garbage can be used. The invention is especially suitable for processing of wastes of synthetic plastic-coated computer paper, wherein valuable raw paper and synthetic plastic material are recovered from the coating.

The mixture which is comminuted to chips is brought advantageously to a temperature of 60° C. and at this temperature is triboelectrically charged by fast movement, for example in a fluidized bed. It has been shown that here the paper is charged negatively and the synthetic plastic material is charged positively.

The thus treated mixture is then supplied by a feeding device into a free-fall separator.

In an electric field which is maintained between the electrodes of the free-fall separator at a level of between 1 and 4 kV/cm, the positively charged particles of the mixture are deflected in direction toward a negatively charged electrode, and the negatively charged particles of the mixture are deflected in direction toward a positively charged electrode and are separately collected on the bottom of the separator. In the event of high field intensity a dense coating of the material to be separated is formed in the upper half of the free-fall separator on the electrodes, which must be continuously removed when the electrostatic field must not grow and the separating output must not be worsened.

It is especially advantageous when the fraction collected on the positive electrode and the fraction collected on the negative electrode are cleaned individually in a second electrostatic separating step with the conditions corresponding to the conditions of the first step, to a practically synthetic plastic-free paper fraction and a practically paper-free synthetic plastic fraction.

Both steps can be conducted both individually and combined in a continuous manner. In the appropriately dimensioned electrostatic free-fall separator, great quantities of mixtures containing paper and synthetic plastic material can be continuously treated without essential technical expenses and in a short time. In this manner recovery of synthetic plastic material and paper on technical scale from paper-synthetic plastic material mixtures is possible, whereby valuable raw material required for paper- or synthetic plastic material manufacture is produced.

EXAMPLE

A mixture composed of 68.1 weight-% of computer paper and 31.9 weight-% of synthetic plastic material is cut to a mean particle size of approximately between 3×10 to 4×20 mm. It is heated to a temperature of 60° C. and at this temperature is moved lively during 5 minutes in a fluidized bed. Then it is separated in an electrostatic free-fall separator in an electric field of 3.5 kV/cm. The paper-enriched fraction contains 94.2 weight-% of paper, and the synthetic plastic material-enriched fraction contains 72.5 weight-% of synthetic plastic material. Each of these fractions is again heated and triboelectrically charged at a temperature of 60° C. in the fluidized bed, and again cleaned in conditions corresponding to the conditions of the first separating step in a second electrostatic separating step.

The single FIGURE of the drawing illustrates a flow-chart of the invention with quantity data. In the post-separation of the paper-raw fraction the paper-concentrate with a purity of 99.8% is produced on the negative electrode. The residue fraction produced on the positive electrode is withdrawn. It contains 61.1% of paper and 38.9% of synthetic plastic material. The intermediate product is supplied back into the cycle.

During the separation of the synthetic plastic material-raw fraction, the synthetic plastic material-fraction is produced on the positive electrode with a purity of 96.9%. A paper-raw fraction with 98.6% purity is produced on the negative electrode which together with the paper-raw fraction produced from the separation in the paper-cleaning step can be processed.

From 100% of effective quantity of a paper-synthetic plastic material mixture the following is produced:

paper-fraction=61.7% effective quantity with 99.8% paper and 0.2% synthetic plastic material
paper yield=90.4%
synthetic plastic material loss=0.4% synthetic plastic material-fraction=29.1% effective quantity with 3.1% paper and 96.9% synthetic plastic material
synthetic plastic material yield=88.4%
paper loss=1.3% residual fraction=9.2% effective quantity with 61.1% paper and 38.9% synthetic plastic material
paper loss=8.3%
synthetic plastic material loss=11.2%

It is to be understood that the arrangement for conducting the above described method includes means for comminuting a paper- and synthetic plastic material-containing mixture, means for triboelectrically charging these particles in a certain atmosphere at a certain temperature, and a free-fall separator having positive and negative electrodes.

It will be understood that each of the elements described above, or two or more together, may also find a useful application in other types of constructions differing from the types described above.

While the invention has been illustrated and described as embodied in a method of and an arrangement for electrostatically separating of paper- and synthetic plastic material-containing mixtures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential features of the generic or specific characteristics of this invention.

What is claimed as new and desired to be protected by Letters Patent is set forth in the appended claims.

We claim:

1. A method of electrostatically separating paper- and synthetic plastic-containing mixtures, comprising the steps of
   comminuting a paper- and synthetic plastic-containing mixture into particles with a width of substantially 3–4 mm and a length of substantially 10–20 mm;
   triboelectrically charging the particles in an atmosphere with a relative moisture of between 5 and 20% at a temperature of between 25° and 80° C.;
   feeding the triboelectrically charged particles into a free-fall separator with an electrostatic field of between 1 and 4 kV/cm, so that the triboelectrically charged particles fall freely through the separator and under the action of the electrostatic field are deflected so that at a bottom of the separator a paper-enriched fraction is collected in the vicinity of a positive electrode, a synthetic plastic-enriched fraction is collected in the vicinity of a negative electrode, and an intermediate fraction is collected therebetween; and
   supplying the intermediate fraction back into the free-fall separator.

2. A method as defined in claim 1, wherein said comminuting step includes comminuting the paper- and synthetic plastic-containing mixture into stripes.

3. A method as defined in claim 1, wherein said comminuting step includes comminuting the paper- and synthetic plastic-containing mixture into chips.

4. A method as defined in claim 1; and further comprising the step of separating the enriched fractions in a second stage of the free-fall cutter so as to produce a practically pure paper-containing fraction and a practically pure synthetic plastic containing-fraction.

5. An arrangement for electrostatically separating paper- and synthetic plastic-containing mixtures, comprising
   means for comminuting a paper- and synthetic plastic-containing mixture into particles with a width of substantially 3–4 mm and a length of substantially 10 –20 mm;
   means for triboelectrically charging the particles in an atmosphere with a relative moisture of between 5 and 20% with a temperature of between 25° and 80° C.;
   a free-fall separator with an electrostatic field of between 1 and 4 kV/cm for feeding the triboelectrically charged particles so that the triboelectrically charged particles fall freely through the separator and under the action of the electrostatic field are deflected so that at a bottom of the separator a paper-enriched fraction is collected in the vicinity of a positive electrode, a synthetic plastic-enriched fraction is collected in the vicinity of a negative electrode, and an intermediate fraction is collected therebetween; and
   means for supplying the intermediate fraction back into the free-fall separator.

* * * * *